United States Patent Office 2,993,922
Patented July 25, 1961

2,993,922
PREPARATION OF ARENE METAL CARBONYLS
John E. Wyman, St. Albans, W. Va., assignor to Union Carbide Corporation, a corporation of New York
No Drawing. Filed Apr. 15, 1959, Ser. No. 806,424
7 Claims. (Cl. 260—429)

This invention relates to organo-metallic carbonyls. More particularly the invention relates to a process for producing arene metal carbonyls of chromium, molybdenum and tungsten.

We have discovered a process whereby a wide variety of arene metal carbonyls may be easily and efficiently prepared from other arene metal carbonyls. According to the process of this invention, an arene metal carbonyl of chromium, molybdenum or tungsten is reacted with an arene organic compound to produce a different arene metal carbonyl. For example, toluene chromium carbonyl may be reacted with mesitylene to produce mesitylene chromium tricarbonyl.

The process of the present invention may be represented by the equation:

$$Ar_aM(CO)_3 + Ar_b \rightleftharpoons Ar_bM(CO)_3 + Ar_a$$

wherein Ar represents an arene organic compound containing the benzenoid ring system, M represents chromium, molybdenum or tungsten, the subscripts $a$ and $b$ indicate that the compounds Ar are not identical, and the double arrow indicates that an equilibrium between reactants and products is established.

The benzenoid ring system is the six-carbon, unsaturated ring which may be represented by the structural formula:

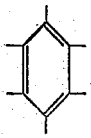

The benzenoid ring system of the compounds Ar may be substituted with one or more of a wide variety of functional groups, for example, hydrogen, alkyl, aryl, aralkyl, alkaryl, alkenyl, alkoxy, aryloxy, alkhydroxy, hydroxyl, amino, N-alkyl amino, N,N-dialkylamino, halogeno, aldehydo, nitro, cyano, acyl, sulfhydryl, alkylsulfonyl, arylsulfonyl, carboalkoxy, carboxamido, carboxyl, sulfonamido and the like.

The arene organic groups of the present invention may be represented in more detail by the formula:

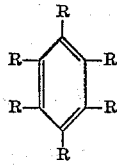

wherein the R groups may be the same or mixed and may be hydrogen and other benzenoid ring system substituents such as alkyl, aryl, aralkyl, alkaryl, alkenyl, alkoxy, aryloxy, alkhydroxy, hydroxyl, amino, N-alkyl amino, N,N-dialkylamino, halogeno, aldehydo, acyl, carboalkoxy, carboxamido, carboxyl and the like as described in the preceding paragraph.

Therefore the process of the present invention may also be represented by the equation

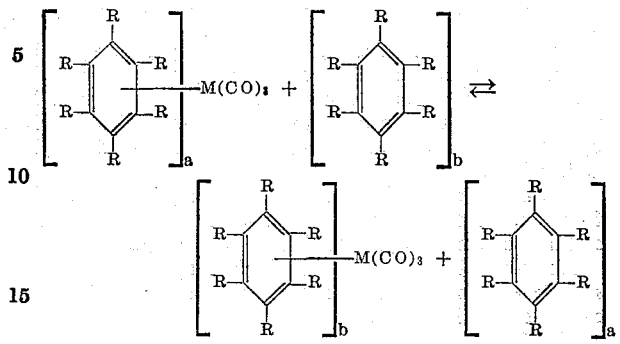

wherein M represents chromium, molybdenum or tungsten, R has the meanings defined in the paragraph next above, the subscripts $a$ and $b$ indicate that the arene organic compounds are not identical, and the double arrow indicates that an equilibrium between the reactants and products is established.

The bonding between the metal atom and the organic moieties takes place through six electrons of the benzenoid ring system of the arene organic group. This type of bonding is discussed in more detail in an article by E. O. Fischer and H. P. Kogler, Angew. Chem. 68, 462 (1956). The substituents on the benzenoid ring system must be of such size and number that the benzenoid ring may approach the metal atom sufficiently closely to permit stable bond formation to take place. For example, tertiary-butylbenzene chromium tricarbonyl and hexamethylbenzene chromium tricarbonyl are stable compounds and may be prepared by the process of this invention, but 1,3,5-tritertiary-butylbenzene chromium tricarbonyl is too unstable to permit isolation because the three bulky tertiary butyl groups do not permit the benzenoid ring system to approach the chromium atom sufficiently closely for stable bond formation to take place.

The organo-metallic compounds of the present invention may be characterized as addition compounds in contrast to organo-metallic substitution compounds. In the latter, a hydrogen or other substituent in the organic nucleus is substituted or removed in the formation of the organo-metallic compound. However, no hydrogen, alkyl or other substituent is removed from or replaced on the arene organic moiety in the formation of the arene metal carbonyls of this invention.

The process of the present invention may be characterized as a transarenation reaction. That is, the arene organic compound in the arene metal carbonyl is replaced by a different arene organic compound.

The transarenation reaction of this invention is preferably carried out in a reaction media furnished by an excess of the reactant arene organic compound although an inert organic solvent such as heptane or petroleum ether may be used.

The temperatures at which the reaction may be carried out vary over a considerable range of from about 175° C. to 300° C. Temperatures above the decomposition temperature of the product are to be avoided. Generally, temperatures in the range of 225° C. to 280° C. are preferred.

The time employed for carrying out the reaction may vary over wide limits depending on the temperature employed. The yields are not materially reduced by maintaining the reaction mixture under reaction conditions for extended periods of time. Generally, it is preferred to maintain the reactants under the desired conditions for at least 15 minutes. Because of the equilibrium established in the reaction, the best yields of the desired product are obtained by using a manyfold stoichiometric excess of the arene organic reactant.

When the boiling point of the arene organic reactant or inert solvent is less than about 175 C., the required reaction temperature may be obtained by carrying out the reaction in a suitable pressure vessel, such as an autoclave.

The arene metal carbonyl reactant may be prepared by known procedures. See, for example, B. Nicholls and M. C. Whiting, Proc. Chem. Soc., May 1958, page 152 where the preparation of benzene chromium tricarbonyl by the reaction of benzene and chromium hexacarbonyl is described.

The arene metal tricarbonyl product may be recovered from the reaction mixtures by standard procedures such as filtration and recrystallization. The exact method depends upon the nature of the individual product, and specific examples of recovery procedures appear in the examples herein below.

The following examples illustrate the process:

EXAMPLE 1

Mesitylene chromium tricarbonyl

A solution of 2.9 grams of toluene chromium tricarbonyl in 200 milliliters of argon-purged mesitylene was placed in a 300 milliliter stainless steel autoclave. The vessel was closed and rocked at 280° C. for 8 hours. After the autoclave had cooled to room temperature, it was opened and the reaction mixture was filtered. Crystalline mestiylene chromium tricarbonyl was obtained by removing the last traces of solvent under a partial vacuum at 85° C.

EXAMPLE 2

Benzene chromium tricarbonyl

A solution of 2.0 grams of toluene chromium tricarbonyl in 200 milliliters of argon-purged benzene was placed in a 300 milliliter stainless steel autoclave. The vessel was purged with argon, closed, and heated with rocking at 270° C. to 275° C. for 7 hours. The contents of the vessel were filtered after cooling to room temperature and then evaporated to dryness under a partial vacuum. The yellow crystalline residue was purified by recrystallization from n-heptane to yield 1.6 grams of benzene chromium tricarbonyl. This represents a yield of 84 per cent of theory based on toluene chromium tricarbonyl.

Benzene chromium tricarbonyl is a yellow crystalline air stable compound, M.P. 162° C.–165° C. which decomposes at 180° C.–190° C. It is soluble in common organic solvents such as benzene, toluene, chloroform, and ether.

EXAMPLE 3 p-Chlorotoluene chromium tricarbonyl

A solution of 1.25 grams of toluene chromium tricarbonyl in 200 milliliters of argon-purged p-chlorotoluene was placed in a 300 milliliter stainless steel autoclave. The vessel was closed and rocked at 200° C. for 10 hours. The autoclave was allowed to cool to room temperature. It was then opened and the contents removed. The crude product was filtered, and the last traces of solvent removed under a partial vacuum in an oil bath at 120° C. The resulting oil crystallized on cooling to yield 0.96 gram of yellow solid residue which was twice recrystallized from n-heptane. Elemental analysis showed the material to be a mixture of p-chlorotoluene chromium tricarbonyl and unreacted starting material, M.P. 65° C.–67° C.

EXAMPLE 4 n-Butylbenzene chromium tricarbonyl

A solution of 7.2 grams of toluene chromium tricarbonyl in 200 milliliters of argon-purged n-butylbenzene was placed in a 300 milliliter stainless steel autoclave and the vessel was rocked at 220° C.–230 C. for a period of 8 hours. After cooling to room temperature, the vessel was opened, the contents filtered and then evaporated to dryness in a stream of argon, the resulting oil was dissolved in heptane, combined with the product from another 3.0 gram run, filtered, and crystallized in a Dry Ice bath. Nine grams of n-butylbenzene chromium tricarbonyl were collected by filtration and dried in a stream of argon.

n-Butylbenzene chromium tricarbonyl is a light yellow oil at room temperature. It is soluble in common organic solvents such as benzene, toluene, heptane, and ether.

Additional examples of the process of this invention are the following: the reaction of benzene molybdenum tricarbonyl and mesitylene in n-heptane to give mesitylene molybdenum tricarbonyl, the reaction of toluene tungsten tricarbonyl and p-xylene to give p-xylene tungsten tricarbonyl, the reaction of p-xylene chromium tricarbonyl and tetrahydro-naphthalene to give tetrahydro-naphthalene chromium tricarbonyl, the reaction of toluene tungsten tricarbonyl and aniline to give aniline tungsten tricarbonyl, the reaction of p-xylene molybenum tricarbonyl and N,N-dimethylaniline to give N,N-dimethylaniline molybdenum tricarbonyl, the reaction of toluene chromium tricarbonyl and anisole to give anisole chromium tricarbonyl, the reaction of bromobenezene chromium tricarbonyl with p-chlorotoluene to give p-chlorotoluene chromium tricarbonyl, the reaction of toluene molybdenum tricarbonyl with hexamethylbenzene to give hexamethylbenzene molybdenum tricarbonyl, the reaction of benzene chromium tricarbonyl and toluene to give toluene chromium tricarbonyl, and the reaction of toluene chromium tricarbonyl with o-phenylene-diamine to give o-phenylenediamine chromium tricarbonyl.

The compounds produced by the process of this invention may be used to deposit a metallic mirror on various substrates. All of the compounds of this invention can be decomposed by employment of temperatures in excess of 400° C. to form a metallic film or coating on substrates such as glass, glass cloth, resins and metals. The metallic coatings provide electrically conducting coatings for such substances as glass cloth and provide corrosion resistant coatings for metals.

For coating glass cloth, a quantity of an arene metal carbonyl produced by the process of this invention is sealed in an evacuated glass tube with a strip of glass cloth which has previously been dried in an oven at 150° C. for one hour; the tube is then heated to about 400° C. for one hour, cooled and opened. The glass cloth increases in weight by up to about 0.01 gram per gram of glass cloth and has a resistivity of approximately 2 ohms per centimeter. Thus, a conducting cloth may be prepared which is useful for the reduction of static charge.

For example, a piece of thin copper wire about 43 millimeters long, a piece of sapphire rod 3 millimeters in diameter and 22 millimeters long, and a rectangular piece of glass cloth about 50 x 20 millimeters average dimension were placed in a 30 millimeter O.D. glass tube 2 feet long. A glazed porcelain boat containing 1 gram of toluene chromium tricarbonyl was placed in the tube which was then purged with argon and heated to 300°

C. The boat was then pushed into the hot zone. After 45 minutes, a chromium plate was deposited on the objects as well as on the walls of the tube, and toluene was condensing on the cool downstream end of the tube.

The glass cloth had attained a very dark metallic luster and would conduct an electric current. The copper wire had a dull, even coating of chromium metal over its entire length. The sapphire rod had an even, bright, shiny surface coating of chromium metal and this chromium plate had a resistance of 150 ohms from one end to the other.

What is claimed is:

1. A process for the production of a stable arene metal carbonyl by the reaction of a different arene metal carbonyl with an arene organic compound at a temperature between about 175° C. and about 300° C., which process may be represented by the equation

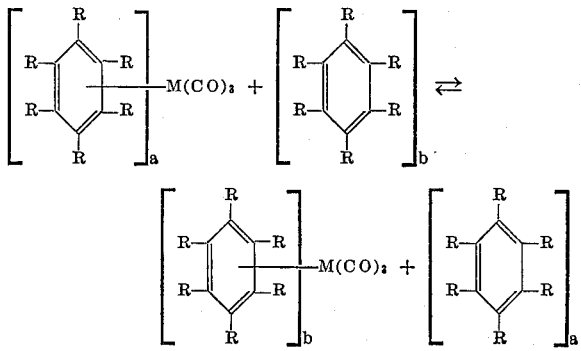

wherein:

(1) each R group is selected from the class consisting of hydrogen, alkyl, aryl, aralkyl, alkenyl, alkoxy, aryloxy, alkhydroxy, hydroxyl, amino, N-alkylamino, N,N-dialkylamino, halogeno, aldehydo, acyl, carboalkoxy, carboxamido and carboxyl;

(2) M is selected from the group consisting of chromium, molybdenum and tungsten;

(3) the subscripts $a$ and $b$ indicate that the arene organic compounds are not identical; and (4) the double arrow indicates that an equilibrium between reactants and products is established.

2. Process in accordance with claim 1 wherein the reaction is carried out in a pressure vessel under pressure.

3. Process in accordance with claim 1 wherein the reaction is carried out in an inert liquid organic solvent.

4. Process in accordance with claim 1 wherein the reaction temperature is between about 225° C. and about 280° C.

5. A process for producing mesitylene chromium tricarbonyl which comprises reacting toluene chromium tricarbonyl and mesitylene in a pressure vessel at about 280° C.

6. A process for producing n-butylbenzene chromium tricarbonyl which comprises reacting toluene chromium tricarbonyl and n-butylbenzene in a pressure vessel at about 220° C. to 230° C.

7. A process for producing benzene chromium tricarbonyl which comprises reacting toluene chromium tricarbonyl and benzene in a pressure vessel at about 270° C. to 275° C.

References Cited in the file of this patent

Natta et al.: "La Chimica E. L'Industria," vol. 40, No. 12, December 1958, pp. 1003–1007.